3,555,017
DERIVATIVE OF 7-ACYLAMINO-CEPHALOSPORANIC ACID

Hans Bickel, Binningen, Rolf Bosshardt, Arlesheim, Bruno Fechtig, Binningen, Enrico Menard, Basel, Johannes Mueller, Arlesheim, and Henrich Peter, Riehen, Switzerland, assignors to Ciba Corporation, New York, N.Y., a corporation of Delaware
No Drawing. Filed Dec. 15, 1967, Ser. No. 690,760
Claims priority, application Switzerland, Dec. 20, 1966, 18,179/66; Apr. 28, 1967, 6,108/67; Oct. 3, 1967, 15,174/67
Int. Cl. C07d *99/24*
U.S. Cl. 260—243                    12 Claims

ABSTRACT OF THE DISCLOSURE

Antimicrobially active 7-dihalogenacetylaminocephalosporanic acids and derivatives and salts thereof.

---

The present invention is concerned with the manufacture of new therapeutically active derivatives of 7-aminocephalosporanic acid of the formula I
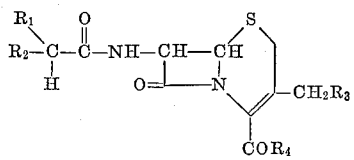

where $R_1$ and $R_2$ are identical or different and each represents fluorine, chlorine, bromine or iodine; $R_3$ represents a hydroxyl group which may be free or esterified by a carboxylic acid, in which ester oxygen atoms may be replaced by sulphur atoms, or a possibly N-substituted carbamoyloxy group in which oxygen atoms may be replaced by sulphur, or a quaternary amino group, and $R_4$ represents a hydroxyl group or a negatively charged oxygen atom.

An esterified hydroxyl group $R_3$, in which oxygen atoms may be replaced by sulphur, is derived from a carboxylic acid and is advantageously the acetoxy group, or a monocyclic or dicyclic arylcarbonyloxy, arylthiocarbonyloxy, arylcarbonylmercapto or arylthiocarbonylmercapto group substituted, for example, by lower alkyl, lower alkoxy, lower alkylmercapto or the nitro group or by halogen atoms, being especially the benzoylmercapto group. As further examples for $R_3$ may be mentioned:

(a) A carbamoyloxy group of the formula

—O—CO—NH—$R_5$ in which $R_5$ stands for an aliphatic, aromatic, araliphatic or heterocyclic residue, especially a linear or branched lower alkyl which may be unsubstituted or substituted, preferably by one or several lower alkoxy groups or halogen atoms, such as the methyl, ethyl or primarily the β-chlorethyl radical; or (b) A thiocarbamoylmercapto group of the formula

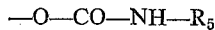

in which $R_5$ has the meaning and $R_6$ is hydrogen or has the same meaning as $R_5$; or (c) A quaternary amino group in which the quaternary nitrogen atom is, for example, part of an aromatic ring, such as a quinoline, isoquinoline or pyrimidine ring, or especially of an unsubstituted or substituted pyridine ring, for example of the formula

where $R_7$ represents hydrogen or one or several lower alkyl, lower alkoxycarbonyl, carbamoyl or carboxyl groups, or one or several halogen atoms.

The salts of the new compounds are metal salts, especially those of therapeutically useful alkali or alkaline earth metals, such as sodium, potassium or calcium, or of ammonium, or salts with organic bases, for example, triethylamine, N - ethylpiperidine, dibenzyl-ethylenediamine or procain. When $R_3$ stands for a basic group, inner salts may be formed.

The new compounds are useful as antimicrobial agents. They act against a wide variety of microorganisms, viz. against both Gram-positive and Gram-negative, for example against penicillin-resistant *Staphylococcus aureus*, *Escherichia coli*, *Klebsiella pneumoniae*, *Salmonella typhosa*, *Bacillus subtilis* and *Bacillus megatherium*. They may, therefore, be used for combating infections caused by such microorganisms, and also as additives to animal fodders, as preservatives for victuals or as disinfectants. The way to use them is analogous to that for known penicillins or cephalosporins. Particularly valuable are those compounds in which the acyl radicals in position 7 is a dichloracetyl or difluoracetyl residue, and $R_3$ represents the acetoxy group, the β-chlorethylcarbamoyl group, or a pyridino group which may be unsubstituted or substituted as indicated above.

The new compounds are obtained when a compound of the formula

II
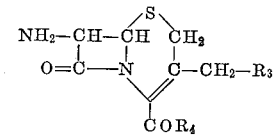

where $R_3$ and $R_4$ have the same meanings as in Formula I is acylated in known manner on the 7-amino nitrogen atom by the group.

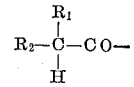

in which $R_1$ and $R_2$ have the same meanings as in Formula I, and if desired, resulting compounds containing as $R_3$ a free hydroxyl group or a hydroxyl group esterified with a carboxylic acid are converted into one another and, if desired, in a resulting compound in which $R_3$ is a hydroxyl group, esterified by a carboxylic acid, in which oxygen atoms may be replaced by sulphur atoms, this group is replaced in known manner by a possibly N-substituted carbamoyloxy group in which oxygen atoms may be replaced by sulphur, or by a quarternary amino group, and, if desired, the resulting compound is converted into a metal salt thereof, such as its alkali or alkaline earth metal salts, or salts with ammonia or with organic bases, or from resulting salts the free carboxylic acids or, if $R_3$ is basic, inner salts are formed.

The acylation is performed in known manner, e.g., with the aid of an acid halide, for example acid chloride, or of a mixed anhydride, for example an anhydride with mono-esterified carbonic acid or with pivalic acid, or preferably with trichloracetic acid or with the free acid itself in the presence of a condensing agent, such as a carbodiimide, for example dicyclohexylcarbodiimide.

Preferred use is made of starting materials that give rise to the above-mentioned particularly active final products.

The cephalosporin derivatives used as starting materials are known or are accessible by known methods.

The compound of the Formula II, in which $R_3$ is a hydroxyl group, is advantageously prepared by the process of British specification 1,080,904, and the compound of the Formula II, in which $R_3$ is a heterocyclic base, especially pyridine, by the processes of Belgian specifications 650,444 and 650,445.

The replacement of the acetoxy group by a carbamoyloxy group has been described in Belgian specification 654,039 and the replacement by a thiocarbamoylmercapto group Belgian specification 637,547. The exchange of the the acetoxy group for the substituents mentioned above can be effected by the process of British specification 912,541 or Belgian Pat. 617,687.

The invention includes also any variant of the process in which an intermediate obtained at any stage of the process is used as starting material and any remaining steps are carried out, or in which the process is discontinued at any stage thereof, or in which the starting materials are formed under the reaction conditions or the reactants may be present in the form of their salts.

The new compounds may be used as medicaments, for example in the form of pharmaceutical preparations containing them in conjunction or admixture with an organic or inorganic, solid or liquid pharmaceutical excipient suitable for enteral, local or parenteral administration. Suitable excipients are substances that do not react with the new compounds, for example water, gelatin, lactose, starches, stearyl alcohol, magnesium stearate, talcum, vegetable oils, benzyl alcohols, gums, propyleneglycol, polyalkyleneglycols, white petroleum jelly, cholesterol or other known medicinal excipients. The pharmaceutical preparations may be, for example, tablets, dragees, ointments, creams or capsules, or in liquid form solutions, suspensions or emulsions. They may be sterilized and/or may contain assistants such as preserving, stabilizing, wetting or emulsifying agents, solution promoters, salts for regulating the osmotic pressure or buffers; they may also contain other therapeutically useful substances. The preparations are formulated by the usual methods.

The following examples illustrate the invention.

In the examples, "MIC" means the minimum inhibitory concentration which is measured either by the serial dilution method commonly employed in testing antimicrobial compounds, or, when indicated, by the gradient plate test described in "Antibiotics," vol. I, by Gottlieb and Shaw, New York, 1967, page 508. The MIC is determined on strains of *Staphylococcus aureus* and *Escherichia coli* found in hospitals. *Staph. aureus* 67/3 is a strain which is resistant to "Penbritin" (α-aminobenzyl-penicillin), *Staph. auerus* SG511 is sensitive to penicillin.

EXAMPLE 1

A solution of 37 ml. (57 g., 0.44 mol) of dichloracetic acid and 56 ml. (40.4 g., 0.4 mol) of triethylamine in 250 ml. of tetrahydrofuran is mixed at —40° C. under nitrogen with 136 ml. of a 50% solution of trichloracetylchloride (0.4 mol) in tetrahydrofuran and allowed to react for 20 minutes at —40° C. Then a solution of 54.5 g. (0.2 mol) of 7-amino-cephalosporanic acid and 98 ml. (0.7 mol) of triethylamine in 800 ml. of methylenechloride is added, and the mixture is stirred for 25 minutes at —40° C. On completion of the reaction the batch is poured into 2 liters of cold aqueous dibasic potassium phosphate solution of 10% strength and the organic solvents are evaporated under vacuum. The aqueous phase is washed at pH 6.0 three times with ethyl acetate, saturated with sodium chloride and finally extracted 3 times with ethyl acetate at pH 2.0. When this extract is dried over sodium sulfate and evaporated under vacuum, it furnishes 170.3 g. of crude product which is agitated with 3.3 liters of petroleum ether+ether 1:1. After filtration and drying under vacuum the insoluble phase weighs 61.5 g.; this crude product is chromatographed on 30 times its own weight of silicagel. The fractions eluted with chloroform + acetone (99:1) contain 27.4 g. of unitary 7-dichloracetyl-amino-cephalosporanic acid which is crystallized from acetone+ether and melts at 155 to 157° C. The ultraviolet spectrum in 0.1 N-sodium bicarbonate solution contains a maximum at 260 m$\mu$ ($\delta$=9100). The thin-layer chromatogram on silicagel in the system n-butanol+glacial acetic acid+water (75:7.5:21) contains a spot at $Rf$=0.44.

EXAMPLE 2

A solution of 2.06 ml. of difluoracetic acid and 4.2 ml. of triethylamine in 18 ml. of absolute tetrahydrofuran is mixed at —50° C. with 3.23 ml. of trichloracetylchloride and then allowed to react for 15 minutes at —50° C.

A cold solution of 4.53 g. of 7-amino-cephalosporanic acid and 7.55 ml. of triethylamine in 47 ml. of absolute methylenechloride is then added and the batch is stirred for 1 hour at —55° C., poured into 70 ml. of an aqueous 10% solution of dihydric potassium phosphate buffer solution, which has been adjusted to pH=5 with 10% aqueous dibasic potassium phosphate, and the organic solvents are evaporated, whereupon the pH value rises to 6.6. The pH value is adjusted to 5.0 with 4 N-hydrochloric acid solution and the batch is washed with 2 x 50 ml. of ethylene acetate. The aqueous phase is covered with 90 ml. of ethyl acetate, adjusted at 0° C. with 4.8 ml. of concentrated hydrochloric acid to pH 2.0, salted out with sodium chloride and extracted with 2 x 40 ml. of ethyl acetate. The ethyl acetate extract is washed with 30 ml. of saturated sodium chloride solution, dried over sodium sulfate and evaporated. The evaporation residue is triturated with 3 x 50 ml. of ether, the solution is decanted and evaporated in a high vacuum, the residue dissolved in 35 ml. of ethyl acetate, mixed with 35 ml. of water and adjusted at 0° C. with N-potassium hydroxide solution to pH=5.8, the organic layer is separated and the aqueous layer evaporated under a high vacuum. The residue is dissolved in 8 ml. of methanol, mixed with 28 ml. of ethyl acetate and evaporated under 12 mm. Hg to about 8 ml. After 2 hours the crystalline potassium salt of difluoracetylamino-cephalosporanic acid is filtered off and dried.

The new compound is characterized by good solubility in water, formamide and methanol and sparing solubility in benzene and ether.

Ultraviolet spectrum (in methanol): maxima at $\lambda_{max}$ 205 m$\mu$ ($\epsilon$=11500) and 263 m$\mu$ ($\epsilon$=7650).

Infrared spectrum (in Nujol): bands at 3.00, 5.60, 5.82, 6.06 (shoulder), 6.32 (shoulder), 6.45, 6.62 (shoulder), 7.37 (shoulder), 7.52 (shoulder), 8.12, 8.65, 9.05, 9.37, 9.70, 10.35 and 12.50$\mu$.

In the thin-layer chromatogram on silicagel in the system n-butanol+pyridine+acetic acid+water (parts by volume: 42+24+4+30), stained with iodine vapour or according to Reindel-Hoppe (Nature 188 310–11 [1960]), the $Rf$ value is 0.42. In the system ethyl acetate+n-butanol+pyridine+acetic acid+water (parts by volume: 42+21+21+6+10), stained as indicated above, the $Rf$ value is 0.35.

In the system n-butanol+pyridine+acetic acid+water (parts by volume. 34+24+12+30), stained as indicated above, the $Rf$ value is 0.55 MIC: *Staph. aureus* SG 511= 0.6 $\gamma$/ml.: *Staph. aureus* 67/3=2.0 $\gamma$/ml.; *Escherichia coli* 67/3=25 $\gamma$/ml.

EXAMPLE 3

A solution of 11.2 g. of dibromacetyl chloride in 80 ml. of dry methylene chloride in a three-necked flask is cooled to —15° C. in a bath of ice and sodium chloride. In the course of an hour a solution of 10.7 g. of 7-amino-cephalosporanic acid in a mixture of 65 ml. of methylene chloride and 10 ml. of triethylamine is stirred in dropwise. Stirring is continued for another 2 hours and the temperature of the mixture allowed to rise to 0 to 5° C.

The dark brown reaction solution is poured into 60 ml. of a 10% dihydric potassium phosphate solution, the pH of the aqueous phase adjusted to 6.0 by the addition of 2 N-sodium carbonate solution, the batch is thoroughly shaken, and the two phases separated. The aqueous phase is extracted first with 80 ml. of methylene chloride and then with 160 ml. of ethyl acetate. The organic phases are washed with 2×80 ml. of phosphate buffer of pH 6.0.

The aqueous phases are then combined, covered with 600 ml. of ethyl acetate, the pH adjusted to 2 by the dropwise addition of concentrated hydrochloric acid, and saturated with sodium chloride. The batch is thoroughly agitated, and the phases then separated, after which the aqueous phase is extracted with 2×200 ml. of ethyl acetate. The organic phases are washed with 80 ml. of saturated sodium chloride solution, dried with calcined sodium sulfate, and filtered through a column of 30 g. of silicagel (height, 3.5 cm.; diameter, 4.5 cm.). The column is finally washed with 200 ml. of acetyl acetate. The nearly colorless eluate is collected and concentrated under reduced pressure, a yellowish paste resulting. The paste is kneaded with 2×50 ml. of a mixture of 1 part by volume of tetrahydrofuran, 2 parts by volume of acetyl acetate, and 10 parts by volume of hexane, whereupon it becomes solid. It is filtered with suction and about 12 g. of an amorphous residue obtained in addition to about 2.5 g. of an oil which does not crystallize.

The residue can be crystallized by dissolving it in about 100 ml. of methanol, filtering, and concentrating it to a volume of about 20 ml. and allowing it to stand for several hours at 0 to −10° C. There are obtained 6.5 g. of crystalline 7 - dibromacetylamino - cephalosporanic acid. The mother liquor (about 6 g.) is dissolved in 20 ml. of methanol, treated with 5 ml. of 3-molar "sodium-hexanoate" solution (immediate crystallization of the sodium salt), and kept at −20° C. for 2 hours. These are obtained 4 g. of the sodium salt of 7-dibromacetylamino-cephalosporanic acid. (Total yield about 55% of the theoretical yield) UV spectrum: (sodium salt in $H_2O$): $\lambda_{max}$ at 255 m$\mu$ ($\epsilon$=9,500).

Optical rotation: $[\alpha]_D^{20°}$=+94° (±1°) (sodium salt in $H_2O$, c.=1). MIC: *Staph.aureus* 67/3=2.5 $\gamma$/ml.; *Staph.aureus* SG 511=0.35 $\gamma$/ml.; *Escherichia coli* 67/3= 4 $\gamma$/ml.

EXAMPLE 4

At −10° C. in an atmosphere of nitrogen, a solution of 39 g. of diiodo-acetic acid and 17.5 ml. of triethylamine in 50 ml. of methylene chloride is stirred into a solution of 14 ml. of trichloracetyl chloride in 100 ml. of methylene chloride, and the whole is allowed to react for 15 minutes. There is then added a solution of 15 g. of 7-aminocephalosporanic acid and 15 ml. triethylamine in 50 ml. of methylene chloride, and stirring is continued for another 45 minutes at −10° C.

Working up in a manner analogous to that of Example 1 yields a portion which is insoluble in petroleum ether+ether. This portion is triturated with ether. The material is chromatographed over 30 times its quantity of silicagel. The fractions eluated with 99.5:0.5 chloroform+acetone are evaporated and then crystallized from methanol. Melting point >300° C., beyond 150° C. slow discoloration. The 7-diiodoacetylamino-cephalosporanic acid is converted into the sodium salt by means of sodium ethyl hexanoate in methanol+chloroform-(1:3).

U.S. spectrum in water: $\lambda_{max}$ 253 m$\mu$ ($\epsilon$=10,150).
Optical rotation $[\alpha]_D^{20}$=81°±1° ($H_2O$; c.=1).

EXAMPLE 5

(1) A solution of 5.7 g. of dichloracetyl chloride in 35 ml. of methylene chloride is added slowly to a solution of 10.5 g. of 3-(desacetoxymethyl)-3-benzoylthiomethyl-7-aminocephalosporanic acid (prepared as described in Belgian Pat. 650,444, Example 22) and 8.3 ml. of diethylamine in 200 ml. of dimethylformamide under a nitrogen atmosphere at −10° C. and with stirring, and the whole is allowed to react for 45 minutes at −10° C. The mixture is then poured on to a phosphate buffer of pH 7 and washed with ethyl acetate. The aqueous phase is extracted at pH 2.0 with ethyl acetate, dried over sodium sulphate and evaporated in vacuo, to yield 13.3 g. of crude product which is chromatographed on 360 g. of silica gel. The fractions eluted with chloroform contain 6.6 g. of unitary 3-(desacetoxymethyl)-3-benzoylthiomethyl-7-dichloracetylamino-cephalosporanic acid. Thin-layer chromatogram on silicagel: system n-butanol+glacial acetic acid (10:1) saturated with water, Rf=0.73.

(2) 52.5 g. of mercury perchlorate of 40% strength are added to a solution of 6.6 g. of 3-(desacetoxymethyl)-3-benzoylthiomethyl - 7 - dichloracetylamino-cephalosporanic acid in 120 ml. of a mixture of dioxan and pyridine (1:1), and the whole is allowed to react for 45 minutes at 45° C. while being stirred vigorously (nitrogen atmosphere). The reaction mixture is cooled, treated with 18.5 ml. of thiobenzoic acid and agitated for 5 minutes. The solvents are evaporated in vacuo and a solution of the residue in 100 ml. of water is filtered off through "Celite." The filtrate is washed successively with 150 ml. of toluene, twice with 100 ml. of Amberlite LA-2 in 200 ml. of toluene each time, and twice with 150 ml. of toluene each time. The aqueous phase is then filtered through a column which contains, from the bottom to the top, 15 ml. of "Sephadex" CM C-25 (H+ form), 60 ml. of "Alox," 15 ml. of "Zeo-Karb" 226 (H+ form), 60 ml. of "Alox" and 15 ml. of "Dowex-1" (acetate form). Celite," organic phases and the column are extracted twice with 50 ml. of water each time, and the column in addition eluted with a further 300 ml. of water. Evaporation of the combined eluates in vacuo and digesting of the residue (3.2 g.) with 15 ml. of alcohol yields 2.2 g. of pure 3 - (desacetoxymethyl)-3-pyridino-methyl-7-dichloracetylamino - cephalosporanic acid. $[\alpha]_D^{20}$=+50°±1° (c.=1 in $H_2O$); ultraviolet spectrum (water): 257 m$\mu$ ($\epsilon$=11,800); thin-layer chromatography on silica gel in the system n-butanol+glacial acetic acid (10:1) saturated with water: Rf=0.06, in the system n-butanol-pyridine+glacial acetic acid+water (38:24:8:30) Rf=0.41. MIC in the gradient plate test: *Staph. aureus* SG 511=0.06 $\gamma$/ml.; *Escherichia coli* 2018=45 $\gamma$/ml.

EXAMPLE 6

(a) 26.5 g. of 3-(desacetoxymethyl)-3-benzoylthiomethyl-7-amino-cephalosporanic acid are dissolved in a mixture of 1.5 liters of dimethylformamide and 19 ml. of triethylamine. The solution is added dropwise in the course of 90 minutes, while stirring, into a mixture cooled to −10° C. of 24.4 g. of dibromacetyl chloride and 150 ml. of absolute methylene chloride. The batch is slowly heated to +10° C. in the course of 80 minutes, while stirring. The solvent is then evaporated under vacuum. The oily residue is dissolved in a system of 1.4 liters of ethyl acetate and 600 ml. of phosphate buffer pH 6. By the addition of 2 N-sodium carbonate solution, the pH is adjusted to 5.7 and, after removal of the organic phase, the aqueous solution extracted with 2×600 ml. of ethyl acetate. The organic phases are dried with sodium sulfate, filtered through a column of 50 g. of silica gel washed with 500 ml. of ethyl acetate and evaporated to dryness under reduced pressure. 17.0 g. of partly crystalline crude product are obtained. The aqueous phase is adjusted to pH 2 with 2 N-hydrochloric acid and saturated with sodium chloride to obtain another 13.3 g. of crude product. The sodium salt of the resulting 3-desacetoxymethyl)-3-benzoylthiomethyl - 7 - dibromacetylamino-cephalosporanic acid has the following characteristics:

U.V spectrum in water:

$\lambda_{max}$=242 ($\epsilon$=16,800), and
=274 ($\epsilon$=19,500);

$[\alpha]_D^{20} = -52° \pm 2°$ (c.=0.5; in 0.1 m. NaHCO$_3$/acetone 1:1). Thin-layer chromatogram on silica gel plates: In the system n-butanol+glacial acetic acid+water 75:7:5:21): R$f$=0.58; in the system n-butanol+pyridine+glacial acetic acid+water (42:24:4:30): R$f$=0.65.

(b) 10.15 g. of the acid obtained according to (a) are dissolved in 150 ml. of pyridine+dioxan (1:1), the solution treated with 43 ml. (65.5 g.) of a 40% mercury perchlorate solution, and allowed to react while being stirred for 45 minutes at 45° C. under an atmosphere of nitrogen. The batch is cooled to 20° C., 22.8 ml. of thiobenzoic acid are added, the whole stirred for 5 minutes, the solvent evaporated in vacuo, and the residue extracted with 120 ml., 60 ml., 60 ml., and 40 ml. of water. The aqueous extracts are washed once with 180 ml. of toluene, twice with 120 ml. of Amberlite LA-2 in 240 ml. of toluene, and twice with 180 ml. of toluene. The aqueous extracts are then successively filtered through Celite and chromatographed on a combined column as described in Example 5; the eluates are evaporated and the residue triturated with a small amount of absolute ethanol. Pure 3 - (desacetoxymethyl)-3-pyridinomethyl-7-dibromacetyl-amino-cephalosporanic acid is so obtained.

U.V. spectrum in water: $\lambda_{max}$=259 ($\epsilon$=13,800); $[\alpha]_D^{20}$=+16±2° (c.=0.5 in water).

Thin-layer chromatogram on silicagel: R$f$=0.05 in the system n-butanol+glacial acetic acid+water (75:7.5:21); R$f$=0.23 in the system n-butanol+pyridine+glacial acetic acid+water (42:24:4:30). MIC in the gradient plate test: *Staph. aureus* SG 511=0.05 γ/ml.; *Escherichia coli* 2018=30/ml.

We claim:
1. A compound of the Formula I

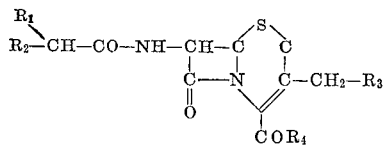

I wherein R$_1$ and R$_2$ each stands for a halogen atom, R$_3$ stands for a hydroxyl group which is free or esterified by a carboxylic acid and in which oxygen atoms may be replaced by sulfur atoms, an unsubstituted or N-substituted carbamoyloxy group in which the oxygen atoms may be replaced by sulfur, or a pyridinio group, and R$_4$ stands for the hydroxyl group or a negatively charged oxygen atom and their therapeutically acceptable salts.

2. A compound of the Formula I as claimed in claim 1, in which R$_1$ and R$_2$ each stands for a halogen atom, R$_3$ stands for the acetoxy group and R$_4$ stands for the hydroxyl group, and its therapeutically acceptable salts.

3. A compound of the Formula I as claimed in claim 1, in which R$_1$ and R$_2$ each stands for a halogen atom, R$_3$ stands for a pyridinio group, and R$_4$ for a negatively charged oxygen atom.

4. A compound of the Formula I as claimed in claim 1, in which R$_1$ and R$_2$ each stands for a halogen atom, R$_4$ stands for the hydroxy group and R$_3$ for a carbamoyloxy group of formula

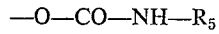

in which R$_5$ represents a lower alkyl radical which is unsubstituted or substituted by one or more lower alkoxy groups or halogen atoms, and its therapeutically acceptable salts.

5. A compound of the Formula I as claimed in claim 1, in which R$_1$ and R$_2$ each stands for a halogen atom, R$_4$ for the hydroxy group, and R$_3$ for a lower alkylcarbamoyloxy group substituted by one or more chlorine atoms, and its therapeutically acceptable salts.

6. A compound of the Formula I as claimed in claim 1, in which R$_1$ and R$_2$ each represents a halogen atom, R$_4$ stands for the hydroxy group and R$_3$ for the β-chlorethylcarbamoyloxy group, and its therapeutically acceptable salts.

7. A compound of the Formula I as claimed in claim 1, in which R$_1$ and R$_2$ each represents a fluorine atom, R$_3$ the acetoxy group and R$_4$ the hydroxy group, and its therapeutically acceptable salts.

8. A compound of the Formula I as claimed in claim 1, in which R$_1$ and R$_2$ each represents a chlorine atom, R$_3$ the acetoxy group and R$_4$ the hydroxy group, and its therapeutically acceptable salts.

9. A compound of the Formula I as claimed in claim 1, in which R$_1$ and R$_2$ each represents a bromine atom, R$_3$ the acetoxy group and R$_4$ the hydroxy group, and its therapeutically acceptable salts.

10. A compound of the Formula I as claimed in claim 1, in which R$_1$ and R$_2$ each represents an iodine atom, R$_3$ the acetoxy group and R$_4$ the hydroxy group, and its therapeutically acceptable salts.

11. A compound of the Formula I as claimed in claim 1, in which R$_1$ and R$_2$ each represents a chlorine atom, R$_3$ the pyridinio group and R$_4$ a negatively charged oxygen atom.

12. A compound of the Formula I as claimed in claim 1, in which R$_1$ and R$_2$ each represents a bromine atom, R$_3$ the pyridinio group and R$_4$ a negatively charged oxygen atom.

References Cited
UNITED STATES PATENTS 3,173,916    3/1965    Shull et al. _____ 260—243C NICHOLAS S. RIZZO, Primary Examiner U.S. Cl. X.R.

424—246

PO-1050
(5/69)

UNITED STATES PATENT OFFICE  6079/1-3/E
CERTIFICATE OF CORRECTION

Patent No. 3,555,017                    Dated   January 12, 1971

Inventor(s) Hans Bickel et al

It is certified that error appears in the above-identified patent and that said Letters Patent are hereby corrected as shown below:

Column 7, claim 1, the right-hand side of the structural formula should read ---

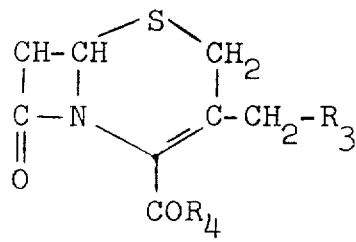

---.

Signed and sealed this 25th day of January 1972.

(SEAL)
Attest:

EDWARD M. FLETCHER, JR.                ROBERT GOTTSCHALK
Attesting Officer                      Commissioner of Patents